July 19, 1966 P. P. BEY ETAL 3,261,258
PHOTOMETRIC DEVICE
Original Filed March 20, 1961 2 Sheets-Sheet 2

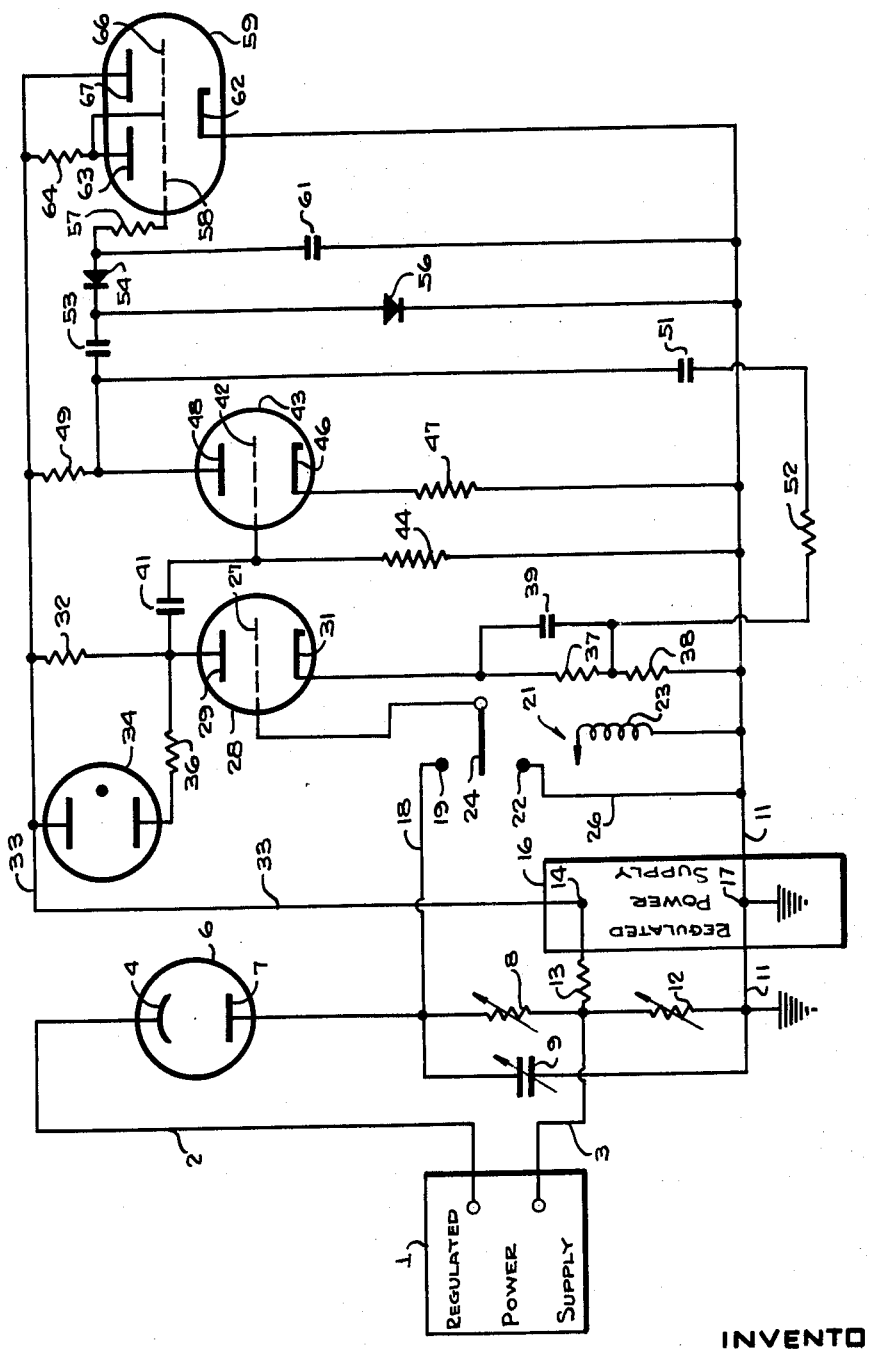

INVENTORS
PAUL P. BEY
& HERBERT RABIN
BY *Hurvitz & Rose*
ATTORNEYS

United States Patent Office 3,261,258
Patented July 19, 1966

3,261,258
PHOTOMETRIC DEVICE
Paul P. Bey, 5709 Abbott Drive, Washington 21, D.C., and Herbert Rabin, 2935 Kanawha St. NW., Washington 15, D.C.
Continuation of application Ser. No. 96,930, Mar. 20, 1961. This application Nov. 13, 1964, Ser. No. 412,587
10 Claims. (Cl. 88—23)

This application is a continuation of application Serial Number 96,930, filed March 20, 1961, and now abandoned.

The present invention relates to photometric devices employed primarily in photographic printing and more particularly to a photometric device for producing an indication of the illumination to which a photocell is subjected and for controlling various photographic processes in accordance with the reading of illumination.

The apparatus of the present invention is in one instance employed for controlling the exposure intervals during the printing of a positive from a photographic negative. Several factors enter into the determination of the exposure interval, there being the density of the negative, the density range of the negative, the distance of the light source from the printing paper and the emulsion speed of the paper.

The normal procedure employed with a photometer is to measure the light passing through a standard portion of a negative and, assuming that the speed of the emulsion of the printing paper is as specified by the manufacturer, the exposure time for the best photograph is calculated. As employed herein, the standard portion of a negative refers to a representative part of the negative which is or may be employed to determine proper exposure for the whole negative. The above procedure, however, makes two assumptions which are not completely valid. First of all, it is assumed that the emulsion speed is as stated by the manufacturer. As a practical matter, the speed of photographic papers of the same type vary from lot to lot and in order to provide correct exposure intervals, the true speed of the emulsion should be determined and the apparatus calibrated for each lot of paper to obtain accurate results. Secondly, it is assumed that the true exposure time can be determined from a typical portion of the negative. However, if the density range of the negative is too great, certain areas of the paper will be underexposed while other areas may be overexposed when an average exposure time is employed. By measuring the density range of a suspicious negative with the apparatus of the present invention, one may determine whether the range of contrasts is too great for the paper being employed or any paper which is regularly available. In those instances where the density range cannot be accommodated by the paper, different exposure intervals should be employed for different portions of the negative. The apparatus of the invention permits a determination of and control of both of these exposure intervals.

Another factor which affects the quality of the photograph print obtained when employing a photometric apparatus is the accuracy with which the apparatus may measure the illumination. The commercially available photometers indicate on a scale the time of exposure by deflecting a needle of a galvanometer or similar device as a function of the illumination sensed by a photoelectric device. Inaccuracies may appear in such an arrangement due to changes in calibration of a meter, drift in the energizing circuits; that is, tube circuits, etc., and other variables which are not readily controllable.

In accordance with the present invention, there is provided a photometric device which may determine and concurrently be calibrated in accordance with actual rather than assumed speed of the emulsion of the printing paper. The photometric device may also measure the density range of a negative and in those instances where different exposures may be employed for various portions of the negative, permits a separate determination of the timing interval required for each portion of the negative. Further the apparatus employs a null balancing metering circuit so that the defects of meter calibration and drift in the energizing circuits are minimized.

More particularly, the apparatus comprises a photocell which may be a conventional vacuum photocell or photomultiplier tube connected in series with a variable resistor across a first power supply. The circuit includes a second variable resistor connected in a voltage dividing network across a second power supply and the two resistors are connected in series with one another. The two power supplies are connected, relative to one another, so that the voltage across the first and second resistances are in opposition and the system is in balance when the opposing voltages across these two resistors are equal and the total voltage across the two is zero. During the initial step of taking a measurement the voltage across the first of these resistors is indicative of light falling on the photocell. By varying the value of the first resistor for a given illumination, the voltage drop across this resistor may be made equal to the voltage drop across the second resistor, this fact being indicated by a null detecting circuit. The value of the first resistor at balance is inversely proportional to the illumination and a scale may be calibrated in appropriate units so that a direct reading of desired quantities may be obtained. In a first embodiment of the present invention, a technique is disclosed which permits the second variable resistor to be set to a value which is a function of the actual speed of the emulsion of the printing paper being employed and so long as that lot of paper is utilized, the value of this resistor may remain fixed. However, it is calibrated whenever there is a change in type of paper or a change in the lot number of a particular type of paper.

In the utilization of the device for producing an indication of the required timing of a photograph, the second resistor is calibrated in accordance with the speed of the paper and the photocell is then subjected to light passing through a standard portion of the negative. The first resistor is then varied so as to produce a null in the measuring circuit, at which time the value of the resistor is a function of illumination. This resistor may now be switched into an RC timing network which is employed to control the actual exposure interval of the negative. The exposure time is directly proportional to the value of the resistor and therefore inversely proportional to illuminations. Consequently a high degree of linearity is obtained.

The null measuring circuit is fed through a chopper device so that A.C. amplification may be employed to improve the stability of the apparatus. The measuring circuit has a novel arrangement of an indicator producing a rough indication of balance and a further indicator producing a fine indication of null. Specifically, a rough indication is provided by a glow tube connected across the anode load of one of the amplifier stages while the fine indication is produced by an electron ray indicator tube. The apparatus may be adjusted rapidly until the glow tube is extinguished and thereafter further adjustment is undertaken by observation of the electron ray indicator.

In a further embodiment of the invention wherein it is necessary to employ two different exposure intervals for different portions of a negative, this occurring in either contact or projection printing, the first variable resistor may actually constitute two distinct resistors which may be alternately switched into the nulling circuit. One of these resistors may first be set in accordance with the illumination passing through the standard portion of the negative. Thereafter the other resistor is switched into the circuit and adjusted in accordance with the light passing a portion of the negative overexposed relative to the standard portion of the negative. These two resistors are now set so that they may be successively switched into the timing circuit, the first resistor effecting exposure of the negative for a time interval resulting from a measurement of the normal portion of the negative and the second resistor effecting exposure of the overexposed portion of the negative for the interval indicated by the second measuring resistor. The method described above may be used for underexposed parts of the negative in a manner analogous to the above method.

As indicated above, the apparatus may be employed to obtain a measurement of the density range of the negative, this measurement being undertaken in many instances to determine whether it is necessary to employ two distinct exposure times for two portions of a single negative. In this instant, both the first and second resistors are employed, it being obvious that in measuring the density range of negative, a second resistor does not have a function relative to the speed of emulsion of a printing paper. Therefore, the second resistor may be employed in the density range measurement.

In view of the high sensitivity of the apparatus of the present invention, it may readily be employed for color printing by employing three distinct units or a single photocell may be employed with three measuring circuits. Alternatively a single measuring circuit may be employed. In such an arrangement three primary color masks are provided which are selectively positionable in front of the photocell so as to make the photocell sensitive to only one color at a time.

It is an object of the present invention to provide a photometric apparatus for use in photographic printing which apparatus may be employed to determine the exposure interval for a printing operation and which is adapted to be calibrated in accordance with the actual speed of the emulsion of the printing paper.

It is another object of the present invention to provide a highly sensitive photometric apparatus which is linear in operation.

It is yet another object of the present invention to provide a highly linear photometric apparatus in which the exposure time is inversely proportional to illumination.

It is another object of the present invention to provide a photometric apparatus having a multiplicity of distinct functions which include determination of the printing time required in a photographic process, determination of the printing times required for various portions of a negative if the range of contrast of the negative is too great for the paper, calibration of the instrument in accordance with the actual speed of the emulsion of the printing paper and determination of the density range of a negative, all of these measurements being accomplished by means of an instrument employing a null-balance measuring circuit in order to increase accuracy of the instrument.

It is another object of the present invention to provide a photometric measurement apparatus employing a null balancing measuring system and an A.C. amplifier having both a rough and fine balance indicator.

It is still another object of the present invention to provide a photometric apparatus which is highly flexible in the functions which can be performed, which is relatively simple in construction and which provides accurate indications of the quantities being measured.

The above and still further objects, features and advantages of the present invention will become apparent upon consideration of the following detailed description of one specific embodiment thereof, especially when taken in conjunction with the accompanying drawings, wherein:

FIGURE 1 is a schematic electrical wiring diagram of a basic embodiment of the present invention;

Figure 3:
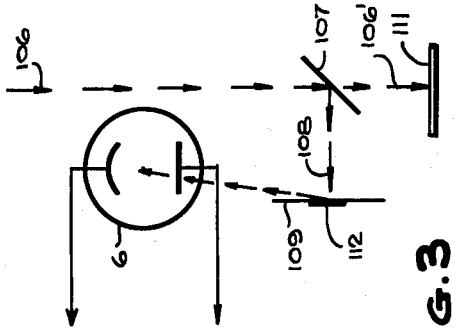
FIGURE 3 illustrates a method of use of the apparatus to increase use of the apparatus, to increase accuracy of exposure times in enlargement operations.

Referring now specifically to FIGURE 1 of the accompanying drawings, there is provided a first regulated power supply 1 for developing a negative voltage on a lead 2 and a positive voltage on a lead 3. The lead 2 is connected to a photocathode 4 of a photoelectric cell 6 having an anode 7. The photoelectric cell 6 may constitute a conventional vacuum cell, as illustrated in the accompanying drawings, may constitute a photomultiplier tube or other photosensitive unit depending upon the system with which the apparatus is to be employed. The anode 7 and the cell 6 is connected via a variable resistor 8 to the lead 3 and is further connected through a variable capacitor 9 to a grounded bus 11. The bus 11 may constitute a ground bus or in the alternative a lead having a predetermined reference potential developed thereon depending upon the environment in which the system is to be utilized.

The bus 11 is connected via a variable resistor 12 to the lead 3 and the junction of the variable resistors 8 and 12 and the lead 3 is connected through a fixed resistor 13 to a positive terminal 14 of a second regulated power supply 16. A negative terminal 17 of the supply is connected to the bus 11. The anode 7 of the photoelectric cell 6 further connected via a lead 18 to a stationary contact 19 of a solenoid 21 having a second stationary contact 22, an A.C. energized winding 23, and a movable contact 24 which is vibrated in response to the application of A.C. to the coil 23. The contact 22 is connected via a lead 26 to the grounded bus 11 while the movable contact 24 is connected to a control grid 27 of a triode 28 having an anode 29 and a cathode 31. The anode 29 is connected via a load resistor 32 to a lead 33 connected to the positive terminal of the second regulated power supply 16. A glow tube indicator 34 and a dropping resistor 36 are connected in series between the anode 29 of the triode 28 and the lead 33. The cathode 31 is connected to ground through series connected resistors 37 and 38 and the resistor 37 is bypassed by an A.C. bypass capacitor 39. The anode 29 of the triode 28 is connected via a coupling capacitor 41 to a grid 42 of a triode amplifier tube 43 and the grid 42 is connected to the bus 11 via a grid resistor 44.

The tube 43 includes a cathode 46 connected to ground via a bias resistor 47 and anode 48 having a load resistor 49 connected between the anode 48 and the high voltage lead 33. A negative feedback loop is provided between the anode 48 of the tube 43 and the cathode circuit of the tube 28 and comprises a capacitor 51 and resistor 52 in series between the anode 48 and the junction of the resistors 37 and 38 in the circuit of the cathode 31 of tube 28. The negative feedback voltage is thus developed across the unbypassed resistor 38 of the cathode circuit of the tube 28. The anode 48 of the tube 43 is connected via a coupling capacitor 53 to the cathode of a first diode 54 and the anode of a second diode 56. The cathode of the diode 56 is connected to the grounded bus 11 and the anode of the diode 54 is connected through a resistor 57 to an input control grid 58 of an electron-ray indicator tube 59. The junction of the anode of the diode 54 and resistor 57 is connected to the grounded lead 11 via a filter capacitor 61. The indicator tube 59 is provided with a ground cathode 62, and a first anode 63 which is connected via a load resistor 64 to the lead 33. The indicator tube 59, which is of completely conventional design is provided with a second grid 66 connected to the anode 63 and a second anode 67 connected directly to the lead 33.

The portion of the apparatus extending from the contacts of the A.C. excited relay 21 to the indicator tube 59 constitutes an A.C. chopper amplifier having a feedback loop to improve stability. The difference voltage developed between the anode 7 of the phototube 6 and ground is chopped by the vibrator 21 and is applied to the A.C. amplifier stage including the tube 28. The signal developed at the anode of the tube 28 is further amplified by the amplification stage including the triode 43. The output signals developed at the anode of the tube 43 are applied to the half wave rectifier and filter circuit comprising diodes 54, 56 and the capacitor 61. In consequence of the arrangement of the diodes 54 and 56, a negative voltage is developed across the capacitor 61 which applies an appropriate bias to the grid 58 of the indicator tube 59. As this voltage becomes more negative, indicating an A.C. signal at the anode 48 of the tube 43, the shadow angle of the tube 59 goes zero, whereas, as this voltage becomes more nearly equal to zero the shadow angle approaches 90° and thus provides a maximum shadow angle when the voltage across the capacitor 61 approaches zero. The glow tube 34 is also employed as an indicator and specifically, the glow tube becoming illuminated when a signal of sufficient amplitude is developed across the resistor 32 and being extinguished when this voltage approaches zero. The glow tube thus provides a rough indication of the input signal applied to the grid 27 of the tube 28 whereas the indicator tube 59 provides a fine indication of this signal.

Proceeding now to a description of the operation of a photocell measuring circuit, the current flowing through the photocell 6 is proportional to the illumination falling on the photocathode 4. The photocell 6 is essentially a constant current device, the current being proportional to the illumination on the cathode of the photocell. Therefore the voltage across the variable resistor 8 increases and decreases, in direct ratio to the change in resistance for a constant illumination and increases and decreases in direct ratio to the illumination for a constant resistance. More specifically, the current generated by the photocell is directly proportional to the illumination and the voltage across the resistor 8 is equal to a constant; that is, the voltage across the resistor 12. Therefore, $$I_c R_8 = K$$

where $I_c$ is the current generated by the photocell and $R_8$ is the value of resistance of the resistor 8. As described subsequently, the resistor 8 is employed in an RC timing circuit to control exposure time so that the time of exposure is proportional to $R_8$, and inversely proportional to the illumination. In consequence of this manner of determining the exposure time, a circuit having a high degree fo linearity is obtained. The voltages developed across the variable resistors 8 and 12 are in opposition, and therefore the voltage of the anode 7 of the photocell 6 with respect to ground is equal to the difference between the voltages across these two resistors; that is, resistors 8 and 12. Initially, and under circumstances to be explained subsequently, the resistor 12 is varied until the voltage drop thereacross is equal to the voltage drop across the resistor 8. Under these conditions, no voltage is developed on the stationary contact 19 of the chopper and no potential is developed across the capacitor 61. In achieving the balanced condition, the resistor 12 is initially varied until the glow across the lamp 34 disappears. Thereafter fine adjustment is obtained with the resistor 12 by observing the breadth of the indication provided by the electron ray indicator 59. After the balanced condition is obtained, the photocell 6 is subjected to the illumination to be measured thereby disrupting the balanced condition existing between the voltage appearing across resistors 8 and 12. The resistor 8 is now varied until a balanced condition is again obtained and the illumination to which the photocell 6 was subjected may be read directly from a dial associated with the manual control for the resistor 8.

The capacitor 9 is employed to filter out the 120-cycle ripple voltage which is developed as a result of the source of illumination being modulated by the A.C. line voltage. The capacitor 9 introduces a time delay in the circuit in that it delays the change in voltage across resistor 8 as this resistor is varied. However, the time constant of the circuit including resistors 8 and 12 and condenser 9 must be such as to filter out the 120-cycle A.C. In order to maintain the proper time constant for filtering of the 120-cycle A.C. but at the same time to minimize the delay in response of the system to variations of the resistor 8, the control of the capacitor 9 is physically ganged with its control of the resistor 8 so that changes in value of the resistor 8 also effect changes in value of the capacitor 9. The ganged arrangement is illustrated more specifically in FIGURE 2 of the accompanying drawings. Alternatively adequate response times may be obtained by employing a fast time constant, low-pass filter.

Figure 2:
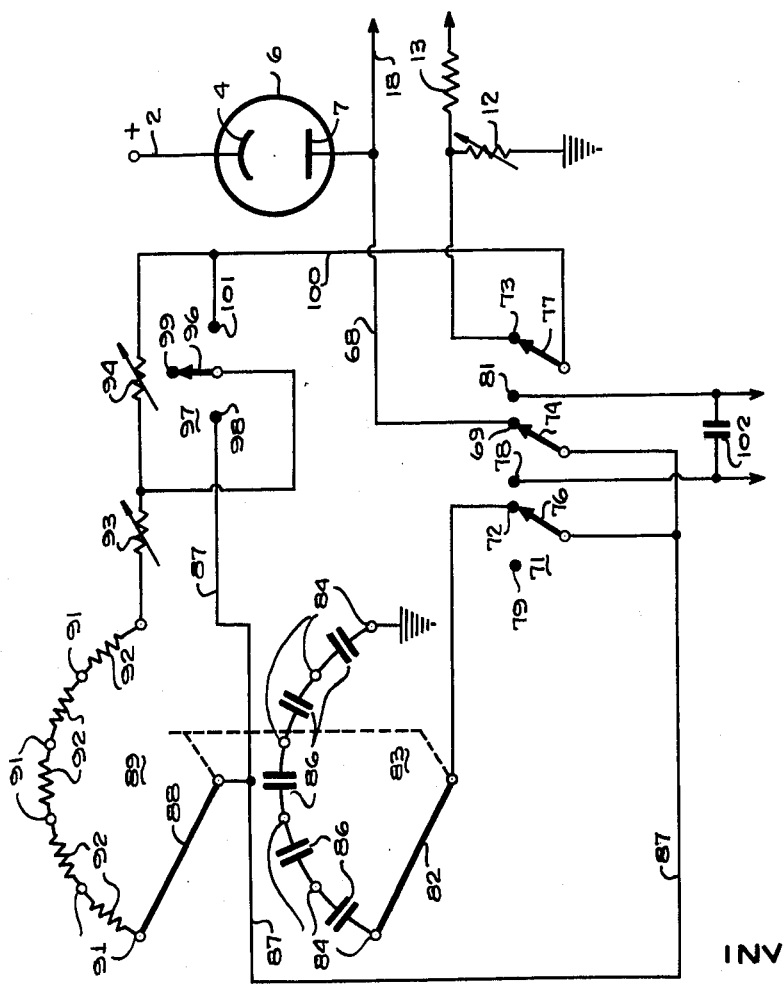
FIGURE 2 is an electrical schematic wiring diagram of an expanded portion of the circuit which introduces a high degree of versatility to the instrument.

Referring now specifically to FIGURE 2 of the accompanying drawings, there is illustrated a complete switching circuit for varying the values of the resistor 8 and capacitor 9 of FIGURE 1 and further introducing elements required for performing additional features not provided by the apparatus in FIGURE 1. Those elements which are common to FIGURES 1 and 2 carry the same reference numerals in both of these figures. In this figure, the anode 7 of the photocell 6 is connected via a lead 68 to a stationary contact 69 of a triple pole, double throw switch 71. The switch is provided with further stationary contacts 72 and 73 of a first position of the switch, the contacts 69, 72 and 73 forming a first group of contacts which are concurrently engaged by movable contacts 74, 76 and 77 respectively. The switch 71 is provided with a further set of stationary contacts 78, 79 and 81 which are adapted to be concurrently engaged by the movable contacts 74, 76 and 77, respectively. The stationary contact 73 is connected through the variable resistor 12 to ground potential while the stationary contact 72 is connected to a movable contact 82 of a rotary switch 83. The switch 83 is provided with a plurality of stationary contacts 84, each pair of these contacts having a different capacitor 86 connected therebetween. One of the plates of the capacitor 86 at the end of the series or string of capacitors, thus provided, is connected to ground potential. The capacitors 86 correspond to the capacitor 9 of FIGURE 1, the switch 83 providing the means for varying the value of the capacitive reactance on the circuit.

The movable contact 74 is connected via a lead 87 to a rotary contact 88 of a second rotary switch 89. The switch 89 is provided with a plurality of stationary contacts 91 and a different resistor 92 is connected between each pair of contacts 91. One end of the resistor 92 at the end of the series or string of resistors thus provided is connected through series connected variable resistors 93 and 94 to the movable contact 77 of the switch 71. The resistors 92 and 93 correspond to the single resistor 8 of FIGURE 1, with the resistor 93 providing a fine adjustment for the series circuit including resistors 92 and the position of the switch 89 providing a course adjustment of the resistance in the circuit. Alternative to this arrangement a variable resistor; that is, a potentiometer may be employed. In such an arrangement the switch 83 and capacitor 86 would be eliminated and a low pass filter employed to reduce the A.C. ripple. The junction of the resistor 93 and 94 is connected to a movable contact 96 of a three position switch 97 having stationary contacts 98, 99 and 101. The contact 98 is connected to the lead 87; the contact 101 is connected to the movable contact 77 via lead 100; and the contact 99 is not connected.

Returning now to the switch 71, the movable contact 76 is connected to the lead 87 as is the movable contact 74. The stationary contact 79 is not connected and the stationary contacts 78 and 81 are connected to a capacitor 102.

The circuit illustrated in FIGURE 2 has a number of applications and the first application to be described relates to its function for determination of an exposure interval for either contact printing or enlarging. When the apparatus of the present invention is utilized for such a purpose, it is first necessary to determine the setting of the resistor 12, which is to be adjusted in accordance with the speed of the paper to be employed. The speed of various printing papers vary as between the types of papers and further may vary with different lots of the same type of paper. The apparatus of the present invention provides means for adjusting the resistor 12 so that the apparatus may be initially calibrated experimentally in accordance with the speeds of the paper employed. Initially, a test print is made, completely independent with the apparatus of the invention, to obtain a good print of a negative which may be chosen at random. The time of this exposure is noted. The apparatus of the present invention is provided with several dials in association with the manual control of the resistor 8 or more specifically in FIGURE 2 of the accompanying drawings, with the manual controls of the switch 89 and the resistor 93. One of the dials associated with these controls is calibrated in time for use when the apparatus is employed as an exposure timer. The switch 89 and resistor 93 are adjusted so that taken together the indicators associated with the manual controls indicate the proper time as determined from the test prints. The switch 71, which is employed to physically connect the resistor 8 or the equivalent resistors 92 and 93 in either the balancing or timing circuit, is now placed in the position illustrated and the switch 97 is positioned to short circuit resistor 94. The photocell 6 is now placed so that the image of the standard part of the aforesaid negative falls on the photocell and the value of the resistor 12 is now set so as to achieve a balanced condition as indicated by the electron ray indicator tube 59. The value of the resistor 12 is now set to the proper value for the speed of the paper being utilized and the apparatus may now be employed in determining exposure intervals for prints.

In operation, the photocell is placed under a portion of a negative similar to that used to calibrate the resistor 12 and the switches 71 and 97 are maintained in the positions discussed above. The position of the switch 89 and the resistor 93 are now adjusted to achieve a balanced condition. The switch 71 is now thrown so that the movable contacts 74, 76, 77 engage the contacts 78, 79 and 81, respectively. The resistance 93 and selected resistances 92 are now placed in parallel with the timing capacitor 102 so that a network is established having a time constant as determined by the setting of the resistors. In a conventional manner, an exposure control apparatus may energize a light for exposing a print for a time as determined by the time constant of the RC network comprising resistor 8 and capacitor 102. The resistors 93 and 92 determine the proper exposure time since their total value is inversely proportional to the illumination on the photocell 6.

If the apparatus is to be employed for purposes of measuring absolute illumination, which constitutes a second application of the apparatus of the present invention, the scale of the resistor 8 may be calibrated initially by a standard source so that the scale reads in foot-candles directly.

A further application of the apparatus is for adjusting the aperture "stop" of a studio camera to obtain a given illumination on the ground glass viewing plate of the camera. In studio cameras, only the aperture stop is adjustable and consequently the utilization of conventional exposure meters is awkward. In accordance with the present invention, exposures on "stop" openings are determined by employing the apparatus of the invention to measure the illumination of a selected part of the image on the ground glass viewing plate. The photocell is placed on the ground glass of the camera with the resistors 8 and 12 set at two prescribed values. The camera "stop" opening may now be adjusted until a balance is obtained in the circuit as determined by the electron ray indicator tube 59. A proper exposure may now be obtained with the "stop" opening determined as above regardless of the placement of the lights about the studio so long as the location of the lights is not altered after the setting of the stop opening.

Another application to which the apparatus of the present invention may be employed is in determining the time interval required for "burning-in" of an overexposed portion of an image. Specifically, if a part of a negative is overexposed relative to other parts thereof, it may be necessary to print the lighter portions of the negative and thereafter to expose the paper to only those portions of the negative which are overexposed. In such an application, the switch 89 and resistors 92 and 93 are initially manipulated to effect a balance when the photocell is subjected to the light passing through the standard portion of the negative. This step in the procedure is affected as follows: the resistor 94 is set at zero and the movable contact 96 of the switch 97 thrown to the center position; that is, contacting the stationary contact 99 so that the resistors 92, 93 and 94 are all in series. The photocell is now placed so as to receive illumination from the standard portion of the negative and the resistors 92 and 93 varied until a balanced condition is obtained. The photocell is then placed so as to receive illumination from the overexposed portion of the negative and the resistor 94 increased until a balance is again obtained. The switch 97 is now thrown to its righthand position, short circuiting the resistor 94 atnd the switch 71 is thrown to its lefthand position so that the resistors 92 and 93 are placed in parallel with the condenser 102 and a normal exposure is effected. Thereafter the switch 97 is thrown to its lefthand position thereby short circuiting the resistors 92 and 93 and an exposure is made with a mask shielding all portions of the paper except those receiving light passing through the overexposed portion of the negative. During this latter operation, a mask is employed to shield all portions of the paper except those receiving light passing through the overexposed portion of the negative.

The apparatus illustrated in FIGURE 2 may also be employed to measure the density range of a negative; that is, to determine the contrast between the lightest and darkest portions of the negative. In order to perform such a measurement, the photocell 6 is placed under the most transparent part of the negative with the switch 71 in the position illustrated in FIGURE 2 and the switch 97 thrown to its lefthand position. The resistor 94 is set at some prescribed value which is known to permit a balance to be obtained over an extended range of values. The value of the resistor 12 is now adjusted for a balance. In the next step the switch 97 is thrown to the righthand position, the photocell is placed under the most dense part of the image and the resistors 92 and 93 are adjusted to produce a balance. The logrithm of the ratio of the value of the resistors 92 and 93 to the value of the resistor 94 indicates the density range of the negative and a further scale associated with the resistors 92 and 93 may be so calibrated.

The apparatus of the present invention may be employed with color photography by providing a balancing system for each of the color emulsions. Specifically, and referring for simplicity to FIGURE 1, a separate variable resistor 8 is provided for each of the emulsions of a primary color and the photocell is provided with color masks so that for each reading of a primary color, the photocell is responsive only to the color of that emulsion. A switch is provided for selectively switching in each of the variable resistors 8 and each is adjusted in accordance with the light of the particular color falling upon the photocell 6. This embodiment of the invention is not illustrated since it is an obvious extension of the apparatus illustrated in FIGURE 2.

A difficulty arises when attempting to measure the light intensity of an image produced by a photographic enlarger since it is difficult to place the photocell in the precise location in which the paper is to be located when exposed. This difficulty may be overcome by an apparatus such as that illustrated in FIGURE 3 of the accompanying drawing. Referring specifically to this figure, the light from the enlarger is directed along a path designated by reference numeral 106 and may be reflected by a mirror 107 along a path designated by the reference numeral 108 or permitted to proceed along a path 106' by removing the mirror. The light proceeding along the path 108 is intercepted by the ground glass 109 while the light proceeding along path 106' is intercepted by an easel 111 for the printing paper. The photocell 6 of FIGURES 1 and 2 is situated so as to receive light from a diffusion disc 112 mounted on the back side of the ground glass 109. The ground glass 109 and easel 111 are displaced by the same distance from the mirror 107 and thus the photocell 6 views the same intensity of light as will be developed at a point on the easel corresponding to the opaque disc viewed on the ground glass. It is preferable to employ a diffusing element for this function rather than collecting the light by spectral reflection, since the sensitivity of the photocell varies across its width and the use of a diffusing element as described eliminates the effect of this sensitivity variation.

The arrangement of FIGURE 3 in effect permits the operator to place the photocell 6 on the same plane as the paper which is subsequently placed in the easel 111, thereby eliminating the effects of differences in placement of the photocell and paper which, particularly for small magnifications, produces incorrect readings. It should be remembered that the inverse square law applies to reductions in light intensity with distance and where a small picture is being produced this effect can become very great even though the photocell may be displaced only a short distance from the position in which the paper will subsequently be placed.

While we have described and illustrated one specific embodiment of our invention, it will be clear that variations of the details of construction which are specifically illustrated and described may be resorted to without departing from the true spirit and scope of the invention as defined in the appended claims.

1. A photometric device in which a first resistive means is to have its resistive value varied in inverse proportion to a light flux to be varied comprising a first series circuit including said first resistive means, a first source of constant voltage and a photosensitive device all connected in series with one another, said photosensitive device being of a type which maintains a constant current in said first circuit with variations in the resistive value of said first resistive means and which varies the current therein as a function of changes in light flux falling on said photosensitive device, a second series circuit including second and third resistive means and a second source of substantially constant voltage all connected in series with one another, one of said second and third resistive means being variable, said first and second circuits being connected together at only one point; a high impedance measuring device connected between a location in each of said circuits remote from said point of connection, one of said variable resistive means of each of said circuits lying between each said location and said point of connection, said locations having the same polarities relative to said point of connection; said sources of voltage and said resistive means being such that the total voltage between said locations may be made equal to zero; and means for adjusting at least said first resistive means to adjust said total voltage to zero in the presence of the light flux to be measured whereby the value of said first resistive means varies in inverse proportion to the light flux to be measured.

2. The combination according to claim 1 wherein said high impedance measuring device includes first means for indicating an approximate null and second means for indicating an exact null.

3. The combination according to claim 1 further comprising a capacitor connected between said locations, the value of said capacitor and the value of said resistive means between said locations providing a low pass filter for a specified frequency.

4. The combination according to claim 3 wherein said capacitor is variable in value, and means for varying said value of said capacitor as a function of variation of said first resistive means to maintain the band pass characteristics of said low pass filter.

5. A photometric device in which a first resistive means is to have its resistive value varied in inverse proportion to a light flux to be varied comprising a first series circuit including said first resistive means, a first source of constant voltage and a photosensitive device all connected in series with one another, said photosensitive device being of a type which maintains a constant current in said first circuit with variations in the resistive value of said first resistive means and which varies the current therein as a function of changes in light flux falling on said photosensitive device, a second series circuit including second and third resistive means and a second source of substantially constant voltage all connected in series with one another, one of said second and third resistive means being variable, said first and second circuits being connected together at only one point; a high impedance measuring device connected between a location in each of said circuits remote from said point of connection, one of said variable resistive means of each of said circuits lying between each said location and said point of connection, said locations having the same polarities relative to said point of connection; said sources of voltage and said resistive means being such that the total voltage between said locations may be made equal to zero; means for adjusting at least said first resistive means to adjust said total voltage to zero in the presence of the light flux to be measured whereby the value of said first resistive means varies in inverse proportion to the light flux to be measured, a first switch means having at least a first and a second position; said switch means connecting said first resistive means in said first circuit in said first position and connecting said first resistive means in said second position in circuit with a capacitor to provide a resistance-capacitor timing circuit; a third variable resistive means connected in series with said first resistive means in said first circuit; a second switch having a number of positions; said switch short circuiting said third variable resistive means in one position and short circuiting said first resistive means in another position; said first switch connecting both said first and third variable resistive means in said timing circuit; and means for rendering only one of said first and third variable resistive means effective in said timing circuit as a function of the position of said second switch and means for independently adjusting said first and third variable resistive means as functions of light intensity measured at different times.

6. A photometric device in which a first resistive means is to have its resistive value varied in inverse proportion to a light flux to be varied comprising a first series circuit including said first resistive means, a first source of constant voltage and a photosensitive device all connected in series with one another, said photosensitive device being of a type which maintains a constant current in said first circuit with variations in the resistive value of said first resistive means and which varies the current therein as a function of changes in light flux falling on said photometric device, a second series circuit including second and third resistive means and a second source of substantially constant voltage all connected in series with one another, said first and second circuits being connected together at only one point; a high impedance measuring device connected between a location in each of said circuits remote from said point of connection, said variable resistive means lying between said location and said point of connection, said locations having the same polarities relative to said point of connection; said sources of voltage and said resistive means being such that the total voltage between said locations may be made equal to zero; and means for adjusting at least said first resistive means to adjust said total voltage to zero in presence of the light flux to be measured whereby the value of said first resistive means varies in inverse proportion to the light flux to be measured.

7. The combination according to claim 1 further comprising means for varying said second resistive means as a function of the speed of emulsion of a printing paper to be exposed by the light flux to be measured.

8. The combination according to claim 1 wherein the second circuit includes means provided to establish a predetermined voltage across said second resistive means whereby the value of the first resistive means is adjusted to a particular value for a standard incident light flux when the voltage across the first and second resistive means is adjusted to zero.

9. The combination according to claim 6 wherein the end of said second resistive means to which said measuring device is connected is held at a reference potential.

10. The combination according to claim 1 further comprising a capacitor and means for switching said first variable resistor into shunt circuit with said capacitor to establish a timing circuit the time constant of which varies inversely with the measured light flux.

References Cited by the Examiner
UNITED STATES PATENTS

| | | | |
|---|---|---|---|
| 2,293,425 | 8/1942 | Dammond. | |
| 3,024,695 | 3/1962 | Nisbet | 88—23 |
| 3,028,499 | 4/1962 | Farrall. | |

JEWELL H. PEDERSEN, *Primary Examiner.*

D. H. RUBIN, *Examiner.*

W. L. SIKES, *Assistant Examiner.*